United States Patent [19]

Kondo et al.

[11] Patent Number: 4,849,037
[45] Date of Patent: Jul. 18, 1989

[54] METHOD FOR PRODUCTION OF FIBER REINFORCED PLASTIC STRUCTURE

[75] Inventors: Katsumi Kondo; Yasuhiro Tsuchiya; Yasushi Yamazawa; Masaki Terada; Tosio Aoki, all of Toyota; Takatsune Niimi, Aichi; Takashi Yamamoto, Ichinomiya; Kunihiro Matsuba, Nagoya, all of Japan

[73] Assignee: Toyota Jidosha Kabushiki Kaisha, Toyota, Japan

[21] Appl. No.: 113,375

[22] Filed: Oct. 29, 1987

Related U.S. Application Data

[63] Continuation of Ser. No. 759,685, Jul. 29, 1985, abandoned.

[30] Foreign Application Priority Data

Aug. 31, 1984 [JP] Japan .................. 59-182485
Sep. 4, 1984 [JP] Japan .................. 59-185229

[51] Int. Cl.⁴ .......................... B29D 3/02; B29G 7/00
[52] U.S. Cl. ................................ 156/166; 156/169; 156/245; 156/433; 156/441; 74/552; 264/258
[58] Field of Search .............. 156/166, 169, 172, 173, 156/175, 245, 433, 441; 264/103, 275, 277, 258; 74/552, 572, 579 R; 118/208, 108

[56] References Cited

U.S. PATENT DOCUMENTS

| | | | |
|---|---|---|---|
| 523,093 | 7/1894 | Whalen | 118/108 |
| 2,429,915 | 10/1947 | Bell | 118/208 |
| 2,558,855 | 7/1951 | Knewstubb et al. | 156/148 |
| 2,684,318 | 7/1954 | Meek | 156/180 |
| 2,905,580 | 9/1959 | Kreier, Jr. | 264/257 |
| 3,442,738 | 5/1969 | Scott et al. | 156/180 |
| 3,480,499 | 11/1969 | Paul, Jr. | 156/175 |
| 4,419,908 | 12/1983 | Reikowski | 74/552 |
| 4,473,520 | 9/1984 | Overcashier et al. | 264/101 |
| 4,673,451 | 6/1987 | Yamazawa et al. | 156/172 |

FOREIGN PATENT DOCUMENTS

| | | |
|---|---|---|
| 3038948 | 4/1981 | Fed. Rep. of Germany . |
| 1561120 | 2/1969 | France . |
| 2418487 | 2/1979 | France . |
| 2468156 | 10/1980 | France . |
| 2515094 | 1/1982 | France . |
| 52-49443 | 2/1977 | Japan . |
| 55-91453 | 7/1980 | Japan . |
| 55-115117 | 9/1980 | Japan . |
| 56-57576 | 5/1981 | Japan . |
| 59-143764 | 8/1984 | Japan . |
| 2004835 | 4/1979 | United Kingdom . |
| 2041858 | 9/1980 | United Kingdom . |
| 2061848 | 5/1981 | United Kingdom . |

Primary Examiner—Michael W. Ball
Assistant Examiner—Jeff H. Aftergut
Attorney, Agent, or Firm—Oblon, Fisher, Spivak, McClelland & Maier

[57] ABSTRACT

A method for the manufacture of a fiber reinforced plastic structure, comprising the steps of winding a continuous long-staple fiber impregnated with a liquid resin around a plurality of winding jigs until the resultant bundle of resin impregnated fibers attains a predetermined thickness; setting rings tightly in place on the linear portions of the resin impregnated fiber bundle between the jigs; and moving the tightly set rings relative to the linear portions thereby wringing the resin impregnated fiber bundle and expelling bubbles entrapped within the fiber bundle.

8 Claims, 3 Drawing Sheets

METHOD FOR PRODUCTION OF FIBER REINFORCED PLASTIC STRUCTURE

This applicaiton is a continuation of application Ser. No. 759,685, filed on July 29, 1985, now abandoned.

BACKGROUND OF THE INVENTION

1. Field of the Invention

The present invention relates to a method for the production of a fiber reinforced plastic structure, and more particularly to a method for defoaming resin-impregnated fibers and to a steering wheel which is used in the likes of an automobile, which is obtained by this method.

2. Description of the Background

The expression "fiber reinforced plastic structure" defines a product which is obtained by initially impregnating a continuous long-staple fiber such as a roving or strand with liquid resin, and then winding the impregnated fiber around the periphery of a reel or jig until the resultant bundle reaches a fixed thickness. The wrapped bundle is then allowed to harden, and then the hardened bundle is removed from the reel or jig as described in GB No. 2,004,835, for example. Since this structure enjoys freedom of design and is suitable for fabrication in many different configurations of one through three dimensions, efforts have been continuing toward the development of applications of the structure in various fields.

An objective in automobile manufacture is to achieve reductions in weight, and this can be achieved by reducing the weight of the various parts from which automobiles are manufactured. In this regard efforts are being made to prepare insert members for steering wheels which are light weight and which have high strength by using continuous long-stable fibers of the likes of high tension glass fibers, carbon fibers, or aromatic polyamide fibers represented by Kevlar in combination with a synthetic resin such as an unsaturated polyester resin, epoxy resin, or phenol resin.

During the course of the manufacture of such a fiber reinforced plastic structure as described supra, however, when a resin impregnated fiber bundle is formed by repetitively winding rovings around a winding jig composed of a central shaft 1, a fixing device 2, an arm 3, and a hook 4 as illustrated in FIG. 4, for example, the force, which compresses the bundle of rovings in the axial direction of the linear empty portion of the fiber bundle, namely in the direction perpendicular to the tensile strength of the roving as indicated by the arrow in the diagram, is not sufficient. Thus, air is entrapped within the resin impregnated fiber bundle 5. The air so entrapped is prevented from being expelled by the viscous layer of liquid resin. Even after the bundle has been hardened, the air remains within in the form of bubbles. The bubbles impair the strength of the fiber reinforced plastic structure and, therefore, prevent the product structure from acquiring sufficient strength.

A method is known by which entrapped bubbles remaining within the bundle encrusted with the resin can be reduced in number. The method involves feeding out the roving, impregnating the roving with resin, and winding the roving under vacuum. Thereafter, the bundle produced is allowed to stand under normal atmospheric pressure or increased atmospheric pressure in order to achieve a notably effective defoaming of the structure as a whole. However, the technique requires a large apparatus. This method, however, is not satisfactory when ample defoaming of specific portions of a given structure is desired. Further, the fiber reinforced plastic structure obtained by this conventional method generally has the drawback that it possesses a random cross section and, therefore, fails to withstand external forces which are brought to bear on the linear portion thereof.

The insert member of the above mentioned steering wheel is prepared using the winding jig 10 constructed as illustrated in FIG. 5. The number is prepared from a continuous long-staple fiber bundle impregnated with resin which is wound a stated number of times around jigs 14 and 15 to form a ring part and a metallic hub 9 along the route indicated by the arrows in the diagram as illustrated in FIG. 11. When the fiber bundle is wound in a fashion so that it passes alternately around the metallic hub 9 as illustrated in FIG. 5, the base of each of the spoke parts 12 of the insert member 11 is parted so that the cross section taken along the direction II-II in the diagram assumes the shape of a two-prong fork as illustrated in FIG. 12. When the insert member of this nature is covered with a resin sheath to form a steering wheel, the steering wheel which is produced does not have sufficient strength and rigidity. A need therefore continues to exist for an improved technique of preparing fiber reinforced plastic structures.

SUMMARY OF THE INVENTION

Accordingly, one object of the present invention is to eliminate the disadvantage suffered by the conventional method of producing fiber reinforced resin parts by providing for the removal of the bubbles which form in a resin impregnated fiber bundle, thereby permitting the production of a fiber reinforced plastic structure possessing a tightly integrated, effective cross sectional shape.

Another object of the present invention is to provide a method for the manufacture of the insert member of a steering wheel which possesses torsional strength and rigidity which is sufficient from a practical point of view.

Briefly, these objects and other objects of the present invention as hereinafter will become more readily apparent can be attained by a method for the manufacture of a fiber reinforced plastic structure by winding a continuous long-staple fiber impregnated with a liquid resin repetitively around the hooks of a winding jig until a resin impregnated fiber bundle of a predetermined thickness is formed, setting rings in place in the linear portion of the fiber bundle between the hooks, thereby squeezing the resin impregnated fiber bundle, and moving the tightly set rings, thereby wringing the resin impregnated fiber bundle and expelling the bubbles from within the fiber bundle In another embodiment of the invention, this technique is adapted to the manufacture of the insert member of a steering wheel, in that squeezing of the resin impregnated fiber bundles which constitute the spoke parts of a steering wheel is accomplished with a squeezing device such as collar rings. The rings wring the fiber bundle and impart a circular cross section to the fiber bundle.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

The long continuous filamentous thread which is used in the present invention can be formed from carbon fibers, glass fibers, or the like. For example, a roving consisting of 2,000 to 30,000 carbon fibers each about 7 μm in thickness or as many glass fibers each 13 to 25 μm in thickness or a roving or yarn formed by intertwisting several such rovings can be used. The resin with which the long continuous filamentous thread is to be impregnated is a thermosetting resin such as, for example, epoxy resin, unsaturated polyester resin, or phenol resin. With respect to the consistency of the liquid resin which is used, the liquid resin must possess a viscosity which is low enough so that the resin sufficiently spreads over the entire surface of the fibers and is high enough so that the spread resin can be stopped from dropping down onto the fiber bundle. The liquid resin should contain a special catalyst promoter so that, when the fiber bundle is squeezed with a ring, for example, the resin which has impregnated the fiber bundle will harden to a certain extent and, consequently, the fiber bundle will be enabled to retain its cross sectional shape unimparied which is conferred thereon by the aforementioned ring.

Figure 2A:
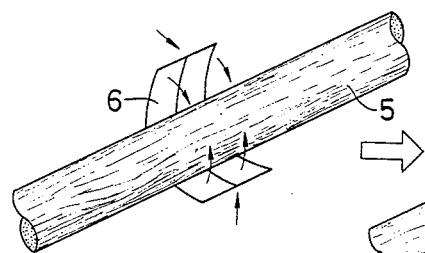
FIG. 2A is a diagram illustrating a ring about to be wrapped around a fiber bundle.
Figure 2B:
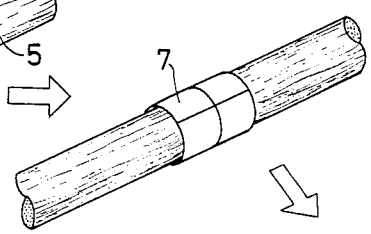
FIG. 2B is a diagram illustrating a ring already wrapped around a fiber bundle.
Figure 2C:
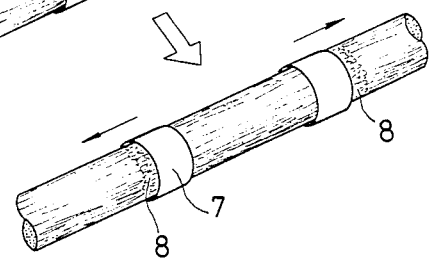
FIG. 2C is a diagram illustrating two portions of a ring which are separated from each other.
Figure 3A:
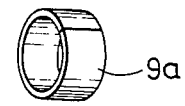
FIG. 3A is a perspective view of a ring which possesses an elliptic cross section and FIGS. 3B and 3C are perspective views of rings which possess quasi-circular cross sections.
Figure 3B:
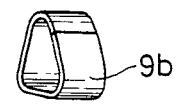
Figure 3C:
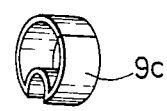
Figure 4:
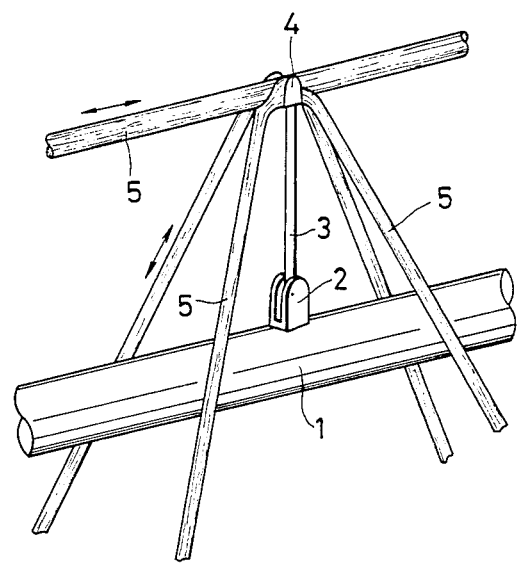
FIG. 4 is a perspective view illustrating the condition in which a conventional resin impregnated fiber structure is manufactured.
Figure 8:
FIG. 8 is a perspective view of the collar ring appearing in FIG. 7.

The rings which are used effectively in the present invention include the circular rings illustrated in FIG. 2B and FIG. 2C, the eliptical rings illustrated in FIG. 3A and the quasi-circular rings illustrated in FIGS. 3B and 3C, and the collar ring illustrated in FIG. 8. The rings can be made of a metal. Otherwise, they may be made of a synthetic resin or rubber on the condition that the substance so used poses no problems in terms of resistance to heat and workability. The rings should possess elasticity to a degree such that these rings, when set in place, enable the resin impregnated fiber bundle to be automatically squeezed. When the resin impregnated fiber bundle is squeezed with rings of such a quasi-circular section as illustrated in FIG. 3A, for example, a cross sectional shape similar to the cross section of the rings is imparted to the fiber bundle so that when an external force is brought to bear perpendicularly upon the linear empty part of the fiber bundle, the bundle can safely bear the stress along the direction of the major diameter of its cross section.

The defoaming treatment effected by the present invention not only accomplishes removal of bubbles from the resin impregnated fiber bundle substantially in a perfect manner, but also heightens the fiber content per unit cross sectional area and synergistically enhances the bending strength and bending elasticity of the fiber bundle. Further, the rings of a selected cross section impart an effective cross sectional shape to the resin impregnated fiber bundle and improve, to a great extent, the strength properties of the fiber bundle relative to the load applied in the perpendicular direction.

The steering wheel which is manufactured by the present process exhibits notably improved strength properties in comparison to conventional steering wheels, because it has a fiber reinforced resin structure as an insert member which has a cross sectional shape that provides strong resistance to the torsional force normally exerted upon steering, it contains very few voids, and it possesses a high fiber content per unit cross sectional area.

Further, the present invention can be worked without requiring provision of any special device, it provides a product of improved quality which can be attained very easily, and it provides a suitable way of mass producing steering wheels which do not suffer from any appreciable loss in quality.

Having generally described this invention, a further understanding can be obtained by reference to certain specific examples which are provided herein for purpose of illustration only and are not intended to be limiting unless otherwise specified.

EXAMPLE 1

Figure 1:
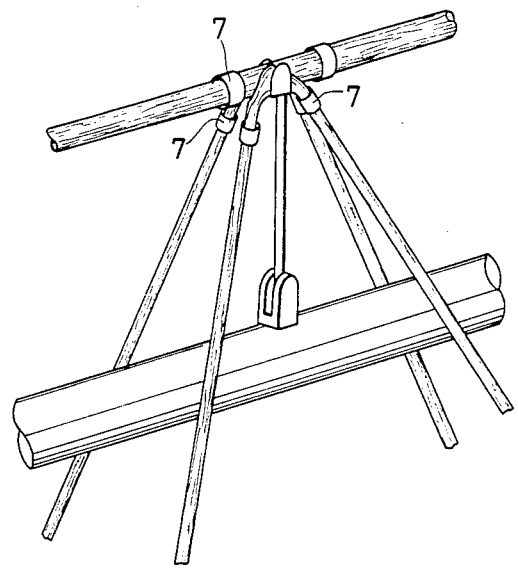
FIG. 1 is a perspective view of a resin impregnated fiber bundle having rings set in place thereon.

A roving 4 mm in diameter formed by 30,000 carbon fibers, each 7 μm in thickness, is impregnated with a liquid epoxy resin (marketed under the trademark designation of "Araldite") having a viscosity of 150 cp and is wound a specified number of times around a winding jig as illustrated in FIG. 1 to obtain a resin impregnated fiber bundle 5 having a thickness of 7 to 13 mm and a fiber volume content ($V_f$) of 42 to 45%.

Then, joint halved aluminum strips 6 and 6 having a thickness of about 1 mm are set in place on the resin impregnated fiber bundle 5 as illustrated in FIG. 2A and are separated into two squeezing rings 7 and 7 as illustrated in FIG. 2B with a prescribed tool. The rings 7 and 7 are moved away from each other in the axial direction of the resin impregnated fiber bundle 5 in order to wring the fiber bundle 5. The number 8 denotes liquid resin which is wrung consequently to the surface. As the rings 7 and 7 are moved, the air remaining in the resin impregnated fiber bundle 5 is driven out and eventually expelled from the resin impregnated fiber bundle 5. At the same time, the excess resin adhering to the fiber bundle can be removed by the wringing action of the rings.

In FIG. 1, the rings 7 are illustrated as held in a state which they assume after bubbles have been removed and after the rings have been brought to the terminals of the linear open portions of the fiber bundle. The resin deposited in the fiber bundle is allowed to harden, with the rings held in that state. Then, the fiber bundle is heated at 120° C. for two hours and is freed from the rings and the jig to give rise to a fiber reinforced plastic structure having a thickness of 6 to 12 mm and a $V_f$ of 53 to 57%.

EXAMPLE 2

The same roving of carbon fibers as used in Example 1 is impregnated with liquid epoxy resin. Rings 9a made of silicone rubber in an elliptic cross section as illustrated in FIG. 3A are spread out and attached at predetermined positions of the fiber bundle, with the result that the rings will resume their original shape by virtue of their elasticity and consequently squeeze the resin impregnated fiber bundle 5. As the bubbles are removed by the procedure of Example 1, a cross sectional shape similar to the cross section of the rings 9a is imparted to the resin impregnated fiber bundle 5. Then the fiber bundle, with the rings 9a still in position or having been removed because the fiber bundle is already capable of retaining its shape intact, is subjected to a heat treatment. This gives rise to a fiber reinforced resin structure having an elliptic cross section having a major diameter of 8 mm and a minor diameter of 4 mm and having a $V_f$ of 55%.

The fiber reinforced plastic structure produced by the procedure of Example 1 and a conventional fiber reinforced plastic structure which had not undergone the present defoaming treatment were subjected to a bending test. The bending strength and the modulus of elasticity upon bending which were found for the two structures are shown below for comparison.

|  | Example 1 | Comparative Experiment |
| --- | --- | --- |
| Bending strength (kg/mm$^2$) | 120 | 90 |
| Modulus of elasticity in bending (kg/mm$^2$) | 8200 | 6500 |

It is noted from the data above that the product of the present invention excels over that prepared by the conventional technique in terms of strength and rigidity, and that particularly for the product of Example 2, the effect of the effective cross sectional shape is manifest.

EXAMPLE 3

Figure 5:
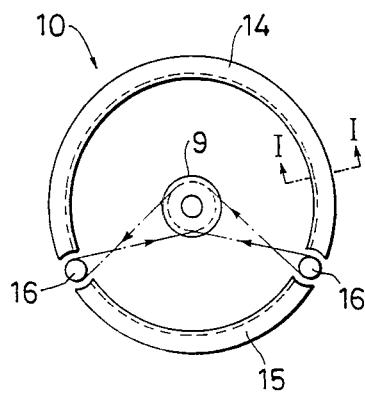
FIG. 5 is a plan view of a winding jig which is to be used for the formation of an insert member of a steering wheel core.

A roving 1 mm in diameter formed of 2,000 glass fibers, each 23 μm in thickness, is impregnated with a liquid epoxy resin (marketed under trademark designation of "Araldite") having a viscosity of 150 cp and is wound around a winding jig 10 constructed as illustrated in FIG. 5.

Figure 6:
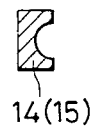
FIG. 6 is a cross section taken through the spoke parts of FIG. 5 in the direction along the line I—I.
Figure 11:
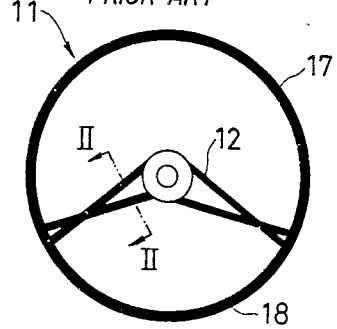
FIG. 11 is a plan view of an insert member of a conventional steering wheel.
Figure 12:
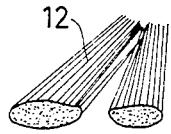
FIG. 12 is a cross section taken through the spoke parts of FIG. 11 in the direction of the line II—II.

The winding jig 10 comprises a metallic hub 9 disposed at the center, jigs 14 and 15 disposed around the boss metal piece 9 in a jointly circular pattern for the formation of a ring part, and spacers 16 and 16 interposed between the opposed terminals of the jigs 14 and 15. The jigs 14 and 15 have a cross sectional semicircular shape as illustrated in FIG. 6 taken in the direction of the line I—I as shown in FIG. 5. In the winding jig of the arrangement described above, the resin impregnated fiber bundle is wound along the groove in the spacer 16, then along the groove in the metallic hub 9, and further along the jigs 14 and 15. By repeating the winding in the manner just described, an insert member 11 is attained which is composed integrally of spoke parts 12, a ring part 17, and a sub-ring part 18 as illustrated in FIG. 11.

Figure 7:
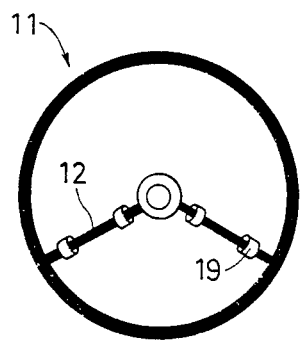
FIG. 7 is a diagram illustrating an embodiment of the present invention in the manufacture of an insert member of a steering wheel.
Figure 9:
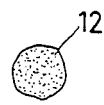
FIG. 9 is a cross section of a spoke part.

Then, collar rings 19 made of an aluminum sheet 1 mm in thickness, as illustrated in FIG. 8, are attached severally at the opposite terminals of the spoke parts 12 as illustrated in FIG. 7, and are fastened on or wrung along the spoke parts. Consequently, the fiber bundle in the spoke parts is tightly gathered and the cross section of the fiber bundle approximates a true circle as illustrated in FIG. 9. During this treatment, the excess liquid resin is squeezed out of the fiber bundle and, at the same time, the air entrapped in the fiber bundle is forced out of the fiber bundle. Then, the fiber bundle, with the collar rings 19 still in position or having been removed because the fiber bundle is already capable of retaining its shape intact, is heated at 120° C. for two hours to give rise to an insert member having a fiber volume content of 40 to 50%. A steering wheel A is produced by covering the insert member with a sheath of urethane resin.

Figure 10:
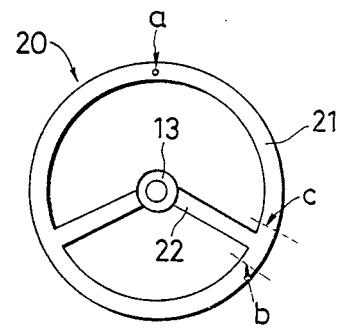
FIG. 10 is a plan view of an insert member of a steering wheel according to the present invention.

Separately, a steering wheel B for comparative purposes was produced from an insert member having a fiber volume content of 20 to 40% and obtained by a conventional method. The two steering wheels A and B were subjected to a bending load test. More specifically, when a load of 50 kg is applied perpendicularly to the plane of the ring of the steering wheel in FIG. 10, which is the surface of the paper, at position "a" of the ring part 21 with the boss part 13 of the steering wheel 20, the steering wheel A is deflected by 29 mm and the steering wheel B by 60 to 70 mm. When the ring 21 is cut at the positions b and c near the spoke 22 as illustrated in FIG. 10 and the spoke 22, which is separated from the ring part, is twisted by an angle of 20° C., the torque consequently generated is 32 or 33 Nm in the steering wheel A and 17 Nm is the steering wheel B. It is clear from these test results that the steering wheel manufactured by using the insert member of the present invention is superior in its torsional properties in comparison to a conventionally manufactured steering wheel.

Having now fully described this invention, it will be apparent to one of ordinary skill in the art that many changes and modifications can be made thereto without departing from the spirit or scope of the invention as set forth herein.

What is claimed as new and is intended to be secured by Letters Patent of the United States is:

1. A method for the manufacture of a fiber reinforced plastic structure, comprising the steps of:
   forming a fiber reinforced plastic structure having spoke portions by winding a continuous long-stable fiber impregnated with a liquid resin around a plurality of winding jigs until a wound bundle of resin impregnated fibers attains a predetermined thickness;
   attaching resilient collar rings firmly about a portion of the periphery of the resin impregnated fiber bundles which correspond to spoke portions of said fiber reinforced plastic structure;
   squeezing said fiber bundle by moving said collar rings along the spoke portions constituted of fiber bundles to wring the resin impregnated fiber bundles of excess resin and to expel trapped air bubbles within said bundle, thereby imparting a circular cross-section to each bundle;

removing the collar rings from the fiber bundles; and thereafter hardening the fiber reinforced plastic structure by an application of heat.

2. The method according to claim 1, wherein said bundle is formed from a continuous long-staple fiber which is impregnated with a thermosetting resin.

3. The method according to claim 2, wherein said long fiber is formed from glass or carbon fibers.

4. The method according to claim 2, wherein said thermosetting resin is an epoxy resin, an unsaturated polyester resin or a phenol resin.

5. The method according to claim 2, wherein said continuous long-staple fiber is formed from a roving or strand of 2,000 to 30,000 carbon or glass fibers.

6. The method of claim 4, wherein said thermosetting resin has a viscosity which is low enough so that the resin is enabled to sufficiently spread over the entire surface of the fibers in said bundle and is high enough so that said resin does not drop out of the fiber bundle.

7. The method according to claim 1, wherein said rings are made from metal, a synthetic resin or rubber.

8. A method for the manufacture of an insert member of a steering wheel having a metallic hub and an outer ring joined to the hub by spoke portions, comprising the steps of:

passing a continuous, resin impregnated, long-staple fiber around the metallic hub of said steering wheel and jigs corresponding to sections of the outer ring portion of said steering wheel, thereby forming an insert member for a steering wheel which incorporates said spoke portions into a structure;

attaching collar rings tightly on the portions of the resin impregnated fiber bundle which form said spoke portions;

squeezing said fiber bundle by moving said collar rings relative to the fiber bundles to wring the resin impregnated fiber bundles of excess resin and to expel trapped air bubbles within the bundle, thereby imparting a circular cross-section to the fiber bundles constituting said spoke portions;

removing the collar rings from the fiber bundles; and thereafter hardening the fiber bundles by an application of heat.

* * * * *